Nov. 12, 1968  R. W. HENSHAW ETAL  3,410,381
CLUTCH MECHANISM CONTROL MEANS
Filed May 12, 1967  3 Sheets-Sheet 3
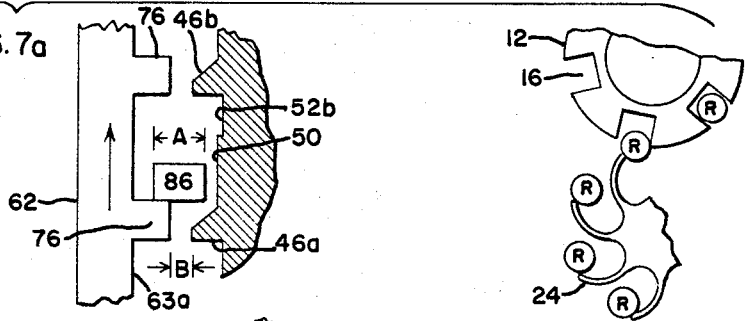
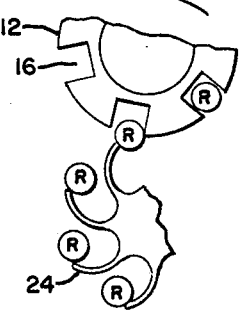
FIG.7a
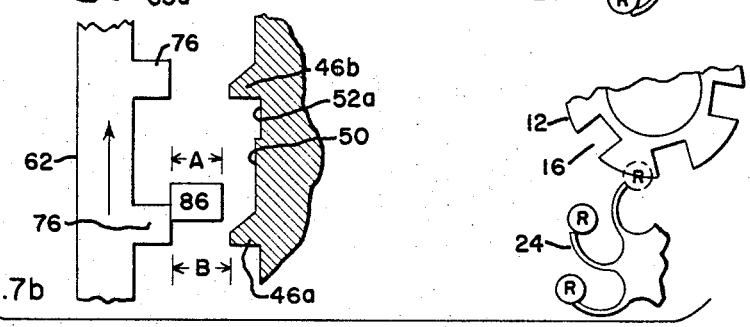
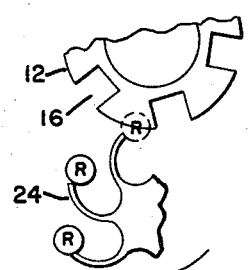
FIG.7b
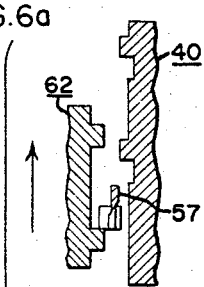
FIG.6a
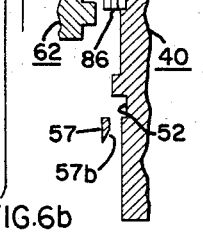
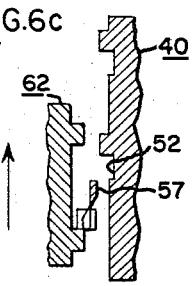
FIG.6b  FIG.6c
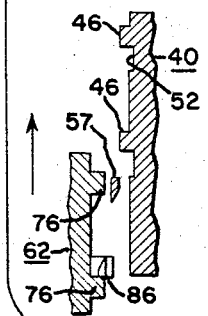
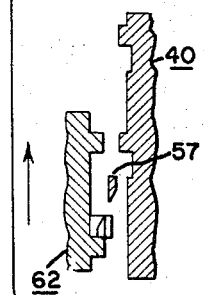
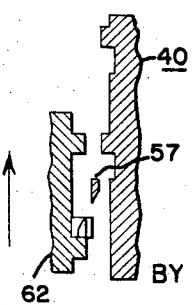
INVENTORS:
ROBERT W. HENSHAW,
DOUGLAS P. TASSIE,
BY Harry C. Burgess
THEIR ATTORNEY.

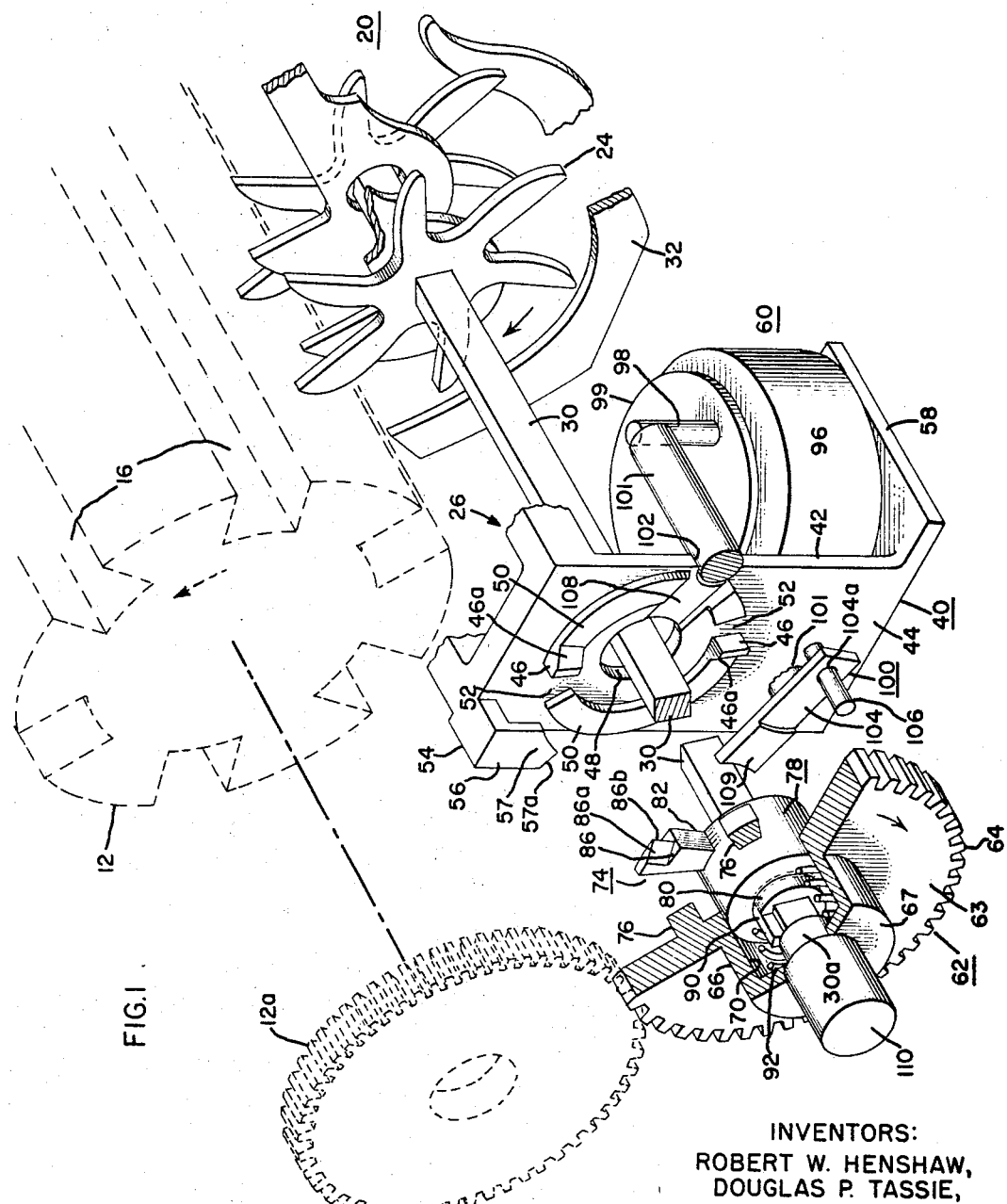

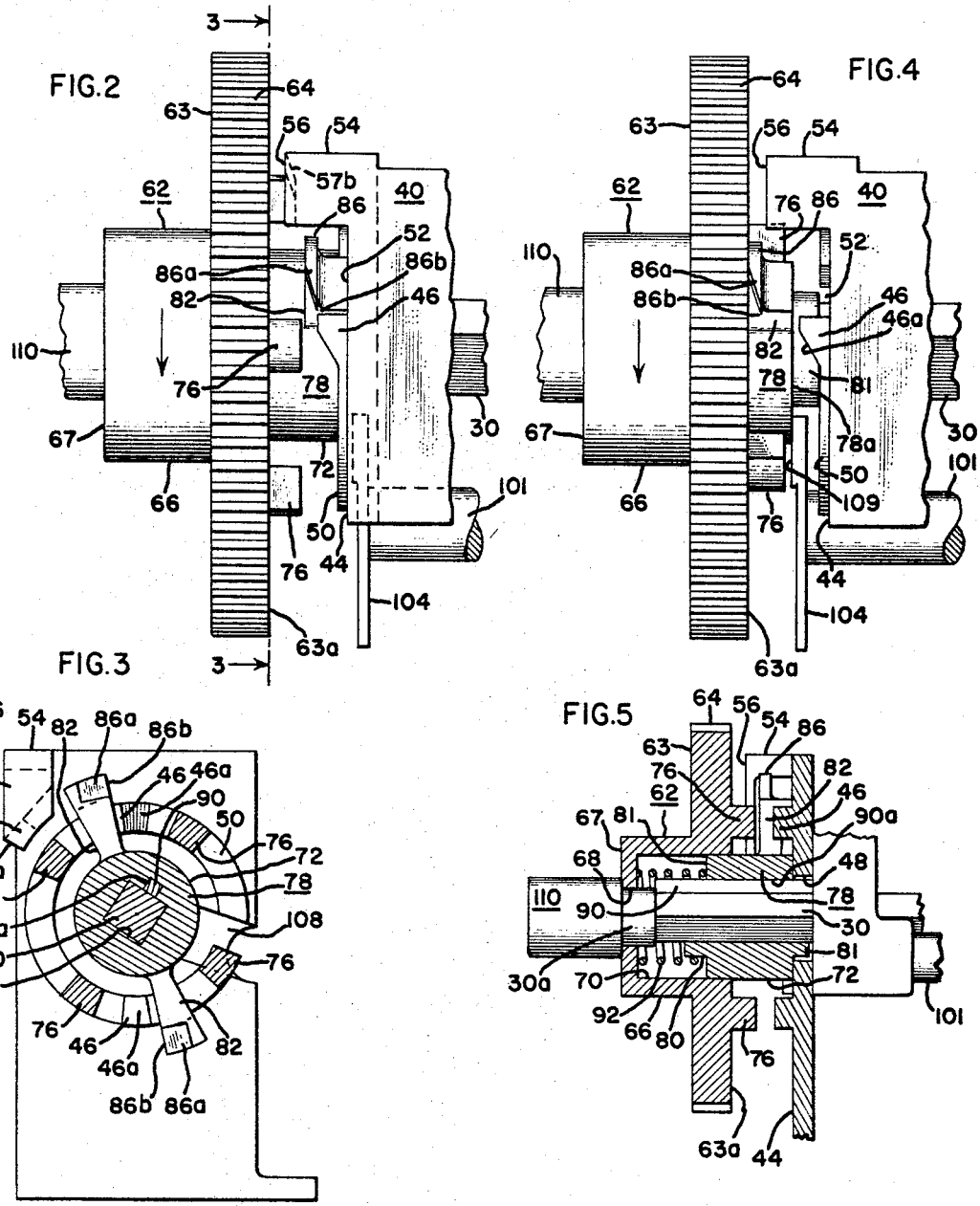

United States Patent Office 3,410,381
Patented Nov. 12, 1968

3,410,381
CLUTCH MECHANISM CONTROL MEANS
Robert W. Henshaw and Douglas P. Tassie, Burlington, Vt., assignors to General Electric Company, a corporation of New York
Filed May 12, 1967, Ser. No. 637,982
5 Claims. (Cl. 192—24)

ABSTRACT OF THE DISCLOSURE

Improvements to a clutch mechanism having a rotating drive member and a driven member including a shaft on which a shiftable member is mounted for rotation therewith, as well as controlled reciprocal movement therealong between the drive member and a stationary declutching support member in spaced opposition to the drive member. The shiftable clutch member includes traveling lug members adapted to selectively engage with similar lug members on the stationary and drive members under the control of cooperating knife-edged blade declutching control means, comprising a fixed blade on the stationary member and traveling blades on the shiftable clutch member, to prevent unwanted lockup between the several clutch mechanism parts.

Background of the invention

This invention relates to clutch mechanisms and, in particular, to a clutch mechanism wherein a driven member must be disengaged in a positive prescribed orientation and then re-engaged in a positive prescribed orientation with respect to a driving member.

It is highly desirable in power driven mechanisms that means be provided to disengage the powered driving member from the driven member, wherein the driven member may comprise an axle or shaft supporting wheels or gears in a machine or apparatus such as an article-handing feeder mechanism. It is known to provide clutch means wherein there is a pair of spaced clutch members, one of which is relatively fixed in the apparatus or machine, the other of which is connected to the driving member, and a shiftable clutch member movable between the spaced clutch members. A variety of devices have been suggested for insuring the full engagement of the shiftable member with one or the other of the spaced clutch members. Typically, such low speed applications as bicycle transmissions have utilized such devices, as, for example, the patent to Richards, 2,825,246. However, these mechanisms leave something to be desired in terms of reliability and strength in applications involving extremely high rates of rotation of the driven member or shaft. Also, where high reliability is an essential requirement there must be no chance of disengagement or failure to engage. For example, in a high rate of fire automatic weapon operating on the Gatling-gun principle, wherein a rotor supports a plurality of barrels for rotation about a common axis, it is necessary to provide means for driving a feeder mechanism to supply cartridges to the gun. It is also highly desirable that at the cessation of power ending a firing burst, that no further ammunition be handed off to the gun. Several means have been suggested for interruption of cartridge feeding at the instant of cessation of power to the gun. Most of these devices, however, result in a not insignificant number of rounds finding their way into the gun and/or being ejected in an unfired state and hence wasted during the process of interruption of cartridge feeding after power has been shut off for several moments. Thus, what is needed is a way to provide an immediate disengagement of the feeder mechanism, usually powered from the gun rotor itself, and also eliminate the possibility of round jamming at the gun. Such a clutch mechanism for an externally powered automatic weapon should also be rugged, reliable, simple, and easy to repair in the field, as these types of guns are more and more being used under adverse field conditions, as in today's "cold-war" operations.

Accordingly, a general object of the present invention is the provision of an improved clutch mechanism for use wherein a driven member must be disengaged and re-engaged from a drive member in a positive manner in an application, such as a high speed article-handing feeder mechanism which requires a high order of reliability.

A more specific object of the present invention is provision of an improved, more reliable clutch for a feeder mechanism having means for positive engagement and disengagement whereby an automatic weapon operating on the Gatling-gun principle may be cleared immediately on cessation of external power to the gun and feeder mechanism.

A further object of the present invention is an improved clutch wherein the opportunity for accidental lockup or jamming of relatively shifting and reciprocating clutch parts in a high-speed feeder mechanism application is minimized.

Summary of the invention

In a disclosed embodiment of the invention adapted for use with a rounds feeder mechanism for a high rate of fire automatic weapon operating on the Gatling-gun principle, there is provided a first driving gear member and a second or driven member in the form of a feeder mechanism sprocket wheel support shaft, the shaft being rotatably supported in an extension of the feeder mechanism housing. Supported from the second driven member or shaft is a shiftable clutch member having a plurality of lug members projecting outwardly from a hub at equally spaced intervals therearound, the hub being keyed to the shaft for reciprocal movement of the shiftable member, along the shaft, as well as rotation therewith. A third stationary surface at the extremity of the feeder housing extension, spaced thereat from a like surface on the relatively rotating first driving member, includes a plurality of equally spaced, circularly arranged generally rectangular lugs projecting outwardly thereof toward similar lugs on the drive surface. The stationary member also supports a fixed radially inwardly projecting knife-edged blade portion having a specific and fixed relationship with respect to the stationary member lugs both in an axial and a radial direction with respect to the driven member shaft axis. The shiftable clutch member hub provides a bearing surface on which the first or driving gear member rides except when there is engagement of their respective lugs. When the driving gear member and shiftable clutch member lugs are disengaged, the shiftable clutch member moves along the driven member shaft away from the first member for engagement of the traveling lugs with the stationary lugs, this latter engagement being maintained after interruption of external power to the gun and feeder mechanism, means being provided to selectively translate the shiftable member back and forth along the shaft in the appropriate direction.

A primary feature of the invention is means for insuring positive disengagement—as well as engagement—of the respective clutch parts rotating at a relatively high speed, with respect to each other, and to prevent unwanted lockup between the several clutch members, including a plurality of rotating knife-edged blade portions provided on the shiftable clutch member which knife-edges are contactable by the fixed knife-edge to insure the positive engage-disengage action. The knife-edged blade control means operates when the shiftable member is in transit from the driving member to the stationary lugs, the traveling knife-edges acting to prevent the shiftable clutch member from being locked between the driving member and the stationary lugs—at the same time—by causing the traveling lugs to proceed essentially directly into a position whereby they are contacted by the stationary lugs for immediate cessation of the feeder mechanism drive. The spacing of the several lugs and the knife-edges in our improved clutch mechanism is precisely selected so that during the declutching action there is no interruption of the drive to insure against unwarranted feeder mechanism stoppage, due to premature drive retardation, which is essential in high rate of fire automatic weapon applications. Also, shelf means may be provided directly behind the stationary lugs whereby the traveling lugs are prevented from disengagement from the driving lugs until just prior to engagement with the stationary lugs, thus assuring the prevention of premature disengagement and hence resultant drive retardation.

FIG. 1 is a pictorial view of the invention in use with an automatic weapon of the Gatling-gun variety, partially and schematically shown, the improved feeder mechanism clutch parts being shown partially in cross-section and separated from their normal positions adjacent one another for greater clarity;

FIG. 2 is a side view of the clutch end of the feeder mechanism drive shaft illustrating the shiftable clutch member in the feeder drive shaft declutched position;

FIG. 3 is a view along line 3—3 of FIG. 2;

FIG. 4 is a view of the parts of FIG. 2 shown in the drive or article feeding position;

FIG. 5 is a cross-sectional view illustrating more clearly the manner in which the drive member, shiftable clutch member, shaft and spring are supported with respect to each other;

FIGS. 6a, 6b, 6c are schematic illustrations of the operation of the knife-edged control feature of our invention; and FIGS. 7a and 7b are schematic illustrations of the drive retardation elimination feature.

Description of the preferred embodiment

Turning now to a detailed description of a disclosed embodiment FIG. 1 illustrates, generally the invention in use with a feeder mechanism for an automatic weapon operating on the Gatling-gun principle. Although the gun forms no part of the present invention it will be helpful to mention several of the parts thereof for a clearer understanding of the operation of our improved clutch mechanism. Thus, shown in the drawing is a rotor 12 which supports a plurality of barrels (not shown) for rotation about a common axis. The barrels, which can be six in number, receive rounds carried by a plurality of bolt members (not shown) movable in the rotary trackways 16 and rotating in an elliptical path about the rotor axis by a camming action of a rotor housing (also not shown), the housing supporting the rotor for relative rotation therewithin. Also illustrated generally at 20 is a feeder mechanism adapted to be supported directly on the gun housing. The feeder mechanism receives a belt of linked cartridges through a chute (not shown), the belt passing over a plurality of sprocket wheels, one of which is indicated at 24, which support the rounds for delinking and handing off to the gun bolts for subsequent chambering. The feeder mechanism includes an end wall 26, which is part of a housing having bearing means (not shown) adapted to support a feeder drive shaft, indicated at 30.

At the feeder end the drive shaft mounts the sprocket wheels which, as stated, receive and guide the individual cartridges to the gun. Fixed guide members 32 may also be provided to help transmit the cartridges to the proper location. Integral with or attached to the extreme end of the feeder housing is a stationary support member or portion, indicated generally at 40. The support member includes a body portion 42 having a rearwardly facing (with respect to the gun barrels) surface 44. Projecting from the surface 44 are a pair of lugs 46—46 having beveled surfaces 46a—46a thereon. The lugs 46 are generally rectangular in plan view, as seen in FIG. 3, and are spaced 180 degrees apart about the axis of a generally centrally located aperture 48 in the body portion of the support member through which the driven member or feeder shaft 30 protrudes. The lugs may be viewed as essentially arcuate segments of what would otherwise be a circular boss or rim concentric to the shaft aperture. A shelf or ramp 50 is also provided on the body portion surface 44, being spaced or cut back from the lugs 46—46 by a prescribed distance so as to provide a pair of lock-wells at 52—52. As seen in the drawing, the lock-wells or lug receptacles are spaced approximately 180 degrees apart about the center of the aperture 48. At one corner of the generally rectangular support member is an inwardly projecting support member 54 integral with the body portion 42. This support member has an end flange 56 spaced from surface 44, the flange having an inwardly projecting blade portion 57 at the extremity of which is a knife-edge 57a, as seen in FIG. 1. The knife-edge 57a is located adjacent the upper stationary—as seen in the drawing—lug and is spaced radially outwardly of the edge of the ramp or shelf 50. As seen in FIG. 2, the knife-edge may also be beveled, at 57b, at an angle back towards the face of the support member. The body portion of the support member 40, in embodiment shown, has a perpendicular flange portion 58 which provides a support for actuation means 60, hereinafter described in detail.

Spaced from the stationary member 40 is a drive gear member, indicated generally at 62, in the drawings. The drive or gear members 62 has a disc shaped body portion 63 having a plurality of gear teeth 64 on the periphery thereof. The gear teeth are adapted to mesh with a gear 12a attached to the rearward face of the gun rotor 12. Thus, when external power is supplied to the rotor, the rotor gear 12a will turn the clutch mechanism driving member 62 in the opposite direction of rotation from that of the gun rotor. The driving gear disc portion 63 includes a hub portion 66 having a rear wall 67 including a centrally located aperture 68, as best seen in FIG. 5, adapted to receive the shaft or driven member 30. The disc portion 63 is effectively cantilevered from the rear wall 67 to provide a recess or inner diameter bearing surface 70 adapted to ride on an outer bearing surface 72 of a shiftable clutch member, indicated generally at 74 in the drawings. The gear or drive member 62 includes a plurality of drive lugs 76 projecting outwardly of the forward surface 63a on the disc portion, which, as seen in FIG. 5, is in direct opposition to the surface 44 of the stationary clutch member carrying the stationary lugs 46. As shown in FIG. 3 the driving member lugs 76 are four in number being equally spaced about the axis of the drive gear. Essentially the lugs 76 form arcuate segments of what would otherwise be a circular rim or boss concentric with the gear disc aperture 68.

Turning now to a detailed description of shiftable clutch member 74, it will be seen to comprise an enlarged hub portion 78 indicated generally in the drawings. The rearward portion of the hub has a relief or cutdown rim portion indicated at 80, as does the forward portion, at 81. It will be seen from the drawings that the outer hub diameter provides the bearing surface 72 for the hub surface 70 of the driving member or gear 62. The axial dimension of the shiftable clutch member hub portion 78 is therefore such as to provide a rotating support for the gear drive during engagement and disengagement of the gear drive lugs from the shiftable clutch member lugs. The shiftable clutch member 74 will thus be seen to include a plurality of arms 82 projecting radially outwardly thereof and equally spaced about the circumference of the hub 78. The outer tips of the arms form "traveling" lug means 86 and outwardly thereof are blade members 86a having knife-edges 86b, as shown in the drawings. It will also be seen that the shaft or driven member 30 has a squared or rectangular outer configuration which will enable the shiftable clutch member to be keyed thereto, i.e., the shaft is received in a similarly shaped aperture 88 in the hub 78, as seen in FIG. 3. A stop or spacer member 90 is utilized to maintain a spaced relationship between surface 63a and 44 on the drive gear and stationary support members, respectively, along the shaft 30, in an axial direction, the spacer being retained in a slot 90a in hub 78. To further control movement of the shiftable member in the manner hereinafter described in detail there is provided a spring member 92 which, as shown in the drawing, is received in the recess of the gear drive hub portion 66, the spring bottoming on the inside of the wall 67 and extending about the shaft and forward about the rearward relief portion 80 of the shiftable member hub.

Actuating means 60 are provided to move the shiftable clutch member along the shaft axis. In the embodiment shown such means comprise an electrically generated solenoid 96 having an actuator pin 98 projecting from a shift plate 99. An actuator and trigger plate assembly, indicated generally at 100, is also provided having an actuator rod 101 received in a passage 102 in the feeder housing end wall 26. One end of the actuator rod engages the actuator pin and the other end contains an elongated, flat trigger plate 104. One end of the trigger plate, which extends perpendicular to the actuator rod and parallel to the opposing clutch member surfaces 44–63a contains an opening 104a receiving a guide pin 106 integral with the housing extension or stationary member 40. The plate is received in a slot 108 in the support member body portion 42, the other end containing a shoe 109 which projects beyond the surface 44 of the support or housing member 40. The shoe is adapted to bear against the forward face 78a of the shiftable clutch member.

In operation as the gun rotor revolves, the rotor gear 12a drives the feeder mechanism drive gear 62, the gear rotating on the bearing surface 72 of the shiftable clutch member. At this point the drive gear freely rotates on the bearing surface 72 *unless* the drive gear lugs 76 and the shiftable clutch member lugs 86 are engaged since the shaft 30 has a circular portion 30a projecting through and clearing the aperture 68 in the center of the drive gear hub. The drive gear is maintained in a rearward position by the spring 92 and a lock assembly 110 on the extreme rearward end of the feeder shaft 30.

In accordance with a safety feature of our invention the clutch mechanism parts are arranged so that normally the shiftable clutch member lugs are disengaged from the drive gear lugs. Thus, as seen in the drawing, the spring 92 is operable to move the drive and shiftable clutch mechanism members apart, i.e., the spring pushes the shiftable clutch member forward along the shaft 30 to disengage drive lugs 76 from the traveling lugs 86. In this situation, as stated above, the drive gear rotates freely on the shiftable clutch member hub bearing surface 72. The feeder mechanism drive shaft being keyed to the shiftable clutch member will not rotate since the traveling lugs are now received in the lock-wells 52—52 adjacent the stationary support lugs 46—46 and retained therein by the action of the spring. However, on energization of external power to the gun, the actuator solenoid pin 98 snaps the actuator 100 to the left, in the drawing, causing the shoe 109 to bear against hub surface 78a to drive the shiftable clutch member rapidly towards the drive member, overcoming the spring force and compressing spring 92. As the opposing shiftable clutch and drive member faces come into abutment the lugs 76 and 86, respectively, of the gear drive member and the shiftable member will engage, thus transmitting the rotor driving force to the gear drive and thence to the feeder shaft which will result in cartridges being moved to the sprocket wheels 24—24 for subsequent handing off to the gun. Obviously, other means could be utilized to reciprocate the shiftable member rapidly along the shaft which will occur to those skilled in the art. For example, actuating force could come from the left portion of the mechanism in the drawing, i.e., spring or trigger means could be provided to drive the shiftable member by elongating the shiftable member hub to extend through the gear 62 and providing suitable means, such as a partial slot in the shiftable member, by which the member could be contacted for reciprocal actuation.

A primary feature of the invention, therefore, concerns control means for assuring rapid, reliable and positive clutch disengagement, or declutching operation (as well as clutch engagement) as it is essential that there be no jamming or lockup of the relatively rotating parts, nor a gradual cessation of the feed mechanism, which could result in a jammed cartridge at the gun breech-feeder sprocket wheel interface. We have therefore provided a knife-edged blade control system utilized primarily wherever the shiftable clutch member is moving from the gear drive member to the stationary or support member for interruption of feed. It will be obvious from the drawings that the gear drive lugs 76, the shiftable clutch member lugs 86, and the stationary lugs 46 are all essentially at the same radial distance from the shaft axis. No knife-edges are seen on lugs 76 since clutch engagement is not as critical with respect to timing. That is, there is no possibility of jamming when the feeder mechanism starts up, in any event, since the gun rotor will barely be rotating at the point wherein the respective drive and shiftable clutch member lugs engage. As will also be seen, stationary or fixed knife-edge 57a on the stationary support member flange blade portion 57 is at the same radial plane as the shiftable clutch member knife-edges 86b. Thus, as the declutching mode of operation is initiated and power is removed from the solenoid 96, the declutching force (in this case provided by spring 92) will move the shiftable clutch member to the right in the drawings across the space normally separating the drive gear surface 63a and the supporting member surface 44. As the shiftable clutch member moves it will be understood, by reference to the schematic illustrations of FIGS. 6a–c that several conditions of operation may occur, namely: (1) A moving or traveling knife-edge 86b on lug 86 will contact the stationary knife-edge 57a bevel-to-bevel, whereupon the shiftable clutch member will be moved (at a slight increase in rate, axially) towards the stationary face, whereat a lock-well 52 (or lock-wells) will receive the shiftable clutch member lug means 86 almost instantaneously (FIG. 6a); or (2) the traveling knife-edge will contact the stationary knife-edge on the flat or nonbeveled side of the lug and/or flange blade, whereupon the moving lug may hold instantaneously—as one of the two stationary lugs 46 is bypassed—and then continue rapidly forward to stop against the other stationary lugs 46—the stationary knife-edge being so positioned in relation to the upper lug 46 (in FIG. 6b) that the moving lug which first strikes a stationary lug cannot move across and stop against the lug owing to the fact that the traveling or moving lug cannot change direction rapidly enough to do so under the force of spring 92; or (3) the traveling knife-edge 86b will contact the stationary knife-edge 57a directly, i.e., there will be an edge-to-edge contact (FIG. 6c), whereupon the operation will revert to either (1) or (2), above. It will be understood that in view of the extreme sharpness and hardness of the blade knife-edges and the high relative speed of the rotating shaft 30 there is no actual blocking, but instead very minute quantities of metal shear off the edges which "rebound" almost infinitesimally and "knuckle" by one another to one side or the other. It is also possible, of course, that the moving knife-edge may not contact the stationary knife-edge at all, whereupon the shiftable clutch member lugs will proceed immediately to a position adjacent the stationary lugs where they are directly received in the lock-wells.

It is extremely important in such applications as round feeder mechanisms that there will be no possibility that the respective lugs will align themselves whereby the shiftable clutch member lug 86 is engaged—at one time—with both the driving member lugs 76 and the stationary lugs 46. If this would occur an extremely dangerous lock-up or stoppage of the gun feed mechanism could occur. It is also extremely important however, that there will be no significant retardation or slipping of the feeding operation while the power is being de-energized. This could also result in a serious stoppage or gun jamming. Thus, as seen in the schematic drawings of FIGS. 7a and 7b, the relative dimensions of the respective lugs and the distance between the opposing extremities of the gear drive member lugs and the stationary member lugs is critical to reliable operation of the device. For this reason, we have determined that dimension A, indicated in the drawings, which is the width of the shiftable clutch member lugs 86, shall have a greater axial length than the spacing—or dimension B—between the opposing extremities of the lugs on the driving gear and on the stationary member, respectively. The reason this dimensioning is critical may be illustrated by a partial showing of the feeder mechanism operation as the rounds R are handed off to the gun rotor trackways 16 in which the bolts (not shown) slide. Recalling that the feeder sprocket wheel 24 is driven by the shaft 30 which is affixed to the shiftable clutch member, during the declutching action the engagement between the shiftable clutch member lug and the drive gear lug is never interrupted until the final declutch position is reached, i.e., with lugs 86 immediately adjacent stationary lugs 46, as seen in FIG. 7a. At this point, the shiftable clutch member lugs will have been received in the lock-wells 52 between the shelf portion 50 of the stationary member face and the rear walls of the stationary lugs 46. In this manner, the rounds are handed off precisely in the right location to be received by the bolts, as shown in the right-hand portion of FIG. 7a. Compare the situation, however, where dimension A is equal to or less than dimension B, as shown in the left-hand portion of FIG. 7b. In such instance, the shiftable clutch member lug 86, having moved to the right of the drawing, will have become disengaged from the drive lug 76. Thus, the shaft rotation will have become slightly retarded relative to the drive gear. A result of such occurrence, a round slippage as shown in the right-hand portion of FIG. 7b happens, wherein the shaft is continuing to rotate to feed rounds in the *interim* period wherein the shiftable clutch member lug is continuing to move to the right—across space B—to become engaged with the stationary lug 46. Shelf 50 is thus provided to insure that the shiftable clutch member lug is never disengaged completely with the drive lug *before* it reaches the exact location of the lockwell 52, whereupon shaft rotation is suddenly stopped. Thus, if the shiftable clutch member lug were to move off the drive lug *immediately* after passing the radial plane of a stationary lug (e.g., lug 46a in FIG. 7, i.e., before coming upon stationary lug 46b) shelf 50 aids in preventing such from happening until the shiftable clutch member lug 86 is approximately in position over the lock-well, i.e., lock-well 52b, in this instance. Thus, as the relatively moving lug 86 under the action of spring 92 reaches the stationary lug it may need only to move a slight distance to the right to reach the opposite lock-well to complete the declutching action. In this manner, continued feeder mechanism operation for delivery of rounds is not lost and there is no misdelivery or jamming at the breech end.

The clutch knife-edge control means, therefore, insures a positive disengagement of the drive means of the feeder mechanism and, at the same time, provides for a sudden and precise locking of the feeder drive shaft. This will shut off movement of cartridges to the gun in a sudden and precisely timed manner due to the controlled orientation of the relatively movable clutch member with respect to the stationary member 40. When shifted rearwardly to initiate drive, member 74 will already have the prescribed orientation with respect to drive member 62 since the latter will have just begun to rotate but no rounds will be fed until lugs 86 and 76 engage, which will be at precisely the right orientation, as shown in FIG. 7a, to insure the correctly timed hand-off or rounds R.

Other modifications and variations of the invention as illustrated will suggest themselves to those skilled in the art and it is intended to cover in the claims appended hereto all such changes as are within the scope and spirit of the invention as set forth herein.

What we claim as new and desire to secure by Letter Patent of the United States is:

1. In a feeder mechanism clutch for use with powered article-handling apparatus including a feeder shaft having a shiftable clutch member mounted thereon for rotation therewith and axial movement therealong, a stationary support surface, a rotating drive surface, said surfaces being axially spaced along said shaft, pluralities of lug means on each of said surfaces and said clutch member, respectively, and actuation means selectively operable to shift said clutch member reciprocally along the shaft for engagement of the clutch member and drive surface lug means or, alternatively, the clutch member and stationary surface lug means, the improvement of feeder shaft declutching control means insuring positive disengagement of the respective lug means all arranged at the same radial location with respect to the shaft axis, said control means comprising:

a stationary knife-edged blade member;

means for supporting said stationary blade member intermediate of and a fixed axial distance from the rotating drive surface and the stationary support surface, said stationary knife-edge being directed radially inwardly toward the axis of the shaft at a fixed radial distance from said axis; and a plurality of circumferentially spaced traveling knife-edged blade members located at the radially outer extremities of the plurality of clutch member lug means, the traveling knife-edges being so located and directed radially as to be contactable by the stationary knife-edge as the clutch member is shifted in one direction to cause the clutch member lug means to engage the stationary surface lug means to stop said feeder shaft in a positive manner to interrupt article feeding, whereby said shaft assumes a prescribed orientation in said feeder apparatus during said stoppage, thereby to prevent article jamming during said stoppage and on subsequent shifting of said clutch member in the opposite direction to cause said clutch member lug means to engage said drive surface lug means to resume article feeding.

2. A feeder mechanism clutch for use with powered article handling apparatus comprising:

an elongated shaft;

a clutch member mounted on said shaft for rotation therewith and reciprocal axial movement therealong;

an externally powered drive member rotatably supported about said shaft;

a stationary member, said stationary member having means supporting said shaft for rotation about its longitudinal axis including an end wall portion having a generally centrally located aperture therein, said shaft being received in said aperture and projecting outwardly of said stationary member at right angles to an outer surface of said end wall portion;

first lug means on a surface of said drive member, second lug means on said outer surface of said end wall portion, said surfaces extending generally perpendicular to the shaft axis and said first and second lug means having extremities in opposition across a predetermined axial distance along said shaft, and third lug means on said reciprocal clutch member, said first, second and third lug means being equally radially distant from said shaft axis;

actuation means operable to selectively shift said clutch member along said shaft in a rearward direction in response to a signal for energization of said external power to cause said third lug means to engage said first lug means, whereby said drive member rotates said shaft for article feeding and, alternatively, in a forward direction in respect to a signal for de-energization of said power to interrupt article feeding; and control means to ensure positive disengagement of said third and said second lug means comprising, a stationary knife-edged member having a fixed radial relationship with respect to said end wall portion outer surface, and at least one traveling knife-edged member affixed to said reciprocal clutch member in the radial plane of said fixed knife-edged member so as to be contactable therewith, whereby when said clutch member is shifted in said forward direction said third lug means disengage said first lug means and then engage said second lug means, said traveling knife-edged member contacting said fixed knife-edged member and cooperating therewith to prevent concurrent engagement of said drive member lug means and said stationary member lug means with said third lug means so as to prevent article jamming during stoppage of the feeding operation.

3. The invention according to claim 2 wherein the axial width of the third lug means on said reciprocating clutch member, with respect to the shaft axis, is greater than the axial width of the distance between opposing extremities of said first and second lug means, also, with respect to the shaft axis, thereby to eliminate premature article feeding drive retardation on de-energization of said external power during reciprocal movement of said clutch member in said forward direction.

4. In a feeder mechanism clutch for powered article-handling apparatus:

a stationary member comprising a feeder housing end wall portion located remotely from an article receiving housing portion, said end wall portion having an outer supporting surface thereon including a generally centrally located aperture;

an elongated shaft supported for rotation about its longitudinal axis and having an article-receiving end and a clutch end, said clutch end protruding beyond said end wall portion surface at right angles thereto;

an externally powered drive member adapted to be rotatably supported about said shaft, said drive member including a recessed hub portion having an inner axially extending bearing surface and a radially-extending rotating support surface;

a shiftable clutch member mounted on said shaft for rotation therewith and reciprocal movement therealong between said stationary and said rotating support surfaces, said shiftable clutch member having an axially extending hub portion having an outer bearing surface received in said drive member hub recess and rotatably supporting said drive member;

first lug means supported on said rotating surface, second lug means supported on said stationary surface, the opposing extremities of said first and second lug means having a fixed axial spacing with respect to said shaft axis, and third lug means supported from said shiftable clutch member hub portion, respective ones of said first, second and third lug means being circumferentially spaced about the shaft axis at the same radial distance therefrom;

actuation means operable to selectively shift said clutch member along said shaft in a rearward direction in response to a signal for energization of external power to cause said third lug means to engage said first lug means, whereby said drive member rotates on said shiftable member to drive said shaft for article feeding and, alternatively, in a forward direction in response to a signal for de-energization of said ceiving housing portion, said end wall power to interrupt article feeding; and control means to ensure positive disengagement of said third and said second lug means comprising, a knife-edged blade member supported from said stationary member at a fixed axial location intermediate said opposing lug means extremities and generally at the same radial distance from said shaft axis as said first and second lug means, and a plurality of traveling knife-edged blade members on said third lug means, whereby when said clutch member is shifted in said forward direction to disengage said third lug means from said first lug means for engagement with said second lug means, said fixed knife-edged blade member and said traveling knife-edged blade members cooperate to prevent concurrent engagement of the respective first, second and third lug means, and wherein the axial distance between said opposing lug extremities is less than the axial width of said third lug means thereby to eliminate premature article feeder drive retardation on de-energization of said external power.

5. A feeder mechanism clutch for article-handling apparatus comprising:

an externally powered gear member having a first plurality of circumferentially arranged lug members on a planar surface thereof;

a driven member, said driven member comprising an elongated shaft having a clutch end and an article-handling end;

a stationary article receiving housing member planar surface opposing said gear member surface and including a central aperture and a second plurality of lug members circumferentially arranged about said aperture, said shaft clutch end projecting through said aperture and beyond said article receiving housing member surface towards said gear member surface;

a shiftable clutch member mounted on said shaft clutch end for rotation therewith and axial movement therealong between said opposing surfaces, said shiftable clutch member supporting said externally powered gear member for rotation about said shaft axis and having a third plurality of circumferentially arranged lug members, all of said pluralities of lug members being equidistant from the shaft axis;

means to apply a declutching force to said shiftable member parallel to the shaft axis in one direction to cause engagement of said third and second pluralities of lug members, and to apply a drive-initiating force in the opposite direction to cause engagement of said third and first pluralities of lug members, the axial distance between opposing extremities of said first and second lug members being less than the axial width of said third lug members thereby to prevent premature drive retardation of said driven member on application of said de-clutching force; and control means to ensure positive dis-engagement of said third and first lug members including, a stationary knife-edged blade member having a fixed axial relationship with respect to said opposing surfaces, and a plurality of traveling knife-edged blade members on said third lug members and contactable by said stationary knife-edged blade member, whereby when said clutch member is shifted in said one direction to disengage said third lug members from said first lug members for engagement with said second lug members, said stationary knife-edged blade member cooperates with said traveling knife-edged blade members to prevent concurrent engagement of said first, second and third pluralities of lug members to eliminate article jamming in said feeder mechanism.

References Cited

UNITED STATES PATENTS

| | | | |
|---|---|---|---|
| 1,599,046 | 9/1926 | Good | 192—24 |
| 2,667,252 | 1/1954 | Meyer | 192—67 |
| 2,717,679 | 9/1955 | Johnson | 192—24 X |
| 2,744,600 | 5/1956 | Kohler et al. | 192—148 |

MARTIN P. SCHWADRON, *Primary Examiner.*

C. M. LEEDOM, *Assistant Examiner.*